United States Patent [19]

Streich et al.

[11] 4,021,210

[45] May 3, 1977

[54] ADSORPTION SYSTEM

[75] Inventors: Martin Streich, Socking; Fritz Jakob, Achmuhle, both of Germany

[73] Assignee: Linde Aktiengesellschaft, Wiesbaden, Germany

[22] Filed: Dec. 19, 1975

[21] Appl. No.: 642,601

[30] Foreign Application Priority Data

Dec. 20, 1974 Germany .......................... 2460513

[52] U.S. Cl. ...................................... 55/26; 55/62; 55/68; 55/75; 55/179
[51] Int. Cl.² ...................................... B01D 53/04
[58] Field of Search .................. 55/25, 62, 179, 58, 55/26, 75, 389, 68; 220/227

[56] References Cited

UNITED STATES PATENTS

| | | | |
|---|---|---|---|
| 1,580,194 | 4/1926 | Glass | 220/227 |
| 3,142,547 | 7/1964 | Marsh et al. | 55/58 X |
| 3,155,468 | 11/1964 | DeMontgareuil et al. | 55/25 |
| 3,702,525 | 11/1972 | Simonet et al. | 55/25 |
| 3,720,042 | 3/1973 | Simonet | 55/25 |
| 3,788,036 | 1/1974 | Lee et al. | 55/25 |
| 3,796,022 | 3/1974 | Simonet et al. | 55/25 |

*Primary Examiner*—Frank A. Spear, Jr.
*Assistant Examiner*—Robert H. Spitzer
*Attorney, Agent, or Firm*—Millen & White

[57] ABSTRACT

In an adsorption-desorption process for separating gaseous mixtures comprising passing a stream of crude gaseous mixture under superatmospheric pressure through a first adsorber, withdrawing from said first adsorber a stream of product gas depleted in undesired component; switching the stream of crude gaseous mixture to a second adsorber when the impurity concentration at a given location before the exhaust end of the first adsorber exceeds a given value in the gas; after the crude gas stream is switched away from said first adsorber, decompressing said first adsorber in at least one decompression stage to release residual product gas therefrom; and employing said residual product gas to re-pressurize an adsorber, the improvement which comprises conducting said decompressing in at least two separate decompression stages, collecting the residual product gas from each decompression stage in separate storage vessels, withdrawing residual product gas from one storage vessel and purging the decompressed adsorber to desorb undesired impurities therefrom, and withdrawing residual product gas from another of said storage vessels and partially re-pressurizing the purged adsorber therewith.

16 Claims, 4 Drawing Figures

ADSORPTION SYSTEM

BACKGROUND OF THE INVENTION

This invention relates to an improved system for separating gaseous mixtures by adsorption and desorption in equipment comprising at least two interchangeable adsorbers provided with suitable adsorbents. In such a system, the gaseous mixture is passed under pressure through one end of an adsorber, and a stream of product gases free from the adsorbed impurities is withdrawn from the other end. The flow of the gaseous mixture is switched to another adsorber the moment the concentration of the impurities at a given location in the adsorber exceeds a given value. This invention is particularly directed to the utilization of the residual gas in the charged adsorber subsequent to the switching step.

It is known from German Auslegeschrift 1,769,936 that an adiabatic process can be employed for separating one or more components from gaseous mixtures, using equipment comprising four or five adsorbers, in order to produce (1) a substantially pure stream of gaseous product and (2) a gaseous stream enriched with impurities. In this known process, after an adsorber is charged, a pressure equalization step is conducted with another, previously purged adsorber, so that the pressure in the charged adsorber is lowered, thereby first releasing residual gas in one direction to purge another adsorber. The pressure is then further decreased but with the flow of gas being in the opposite direction to desorb the previously adsorbed components. Then the adsorber is purged, and the pressure is increased therein partly by pressure equalization with a previously charged adsorber, and partly by the introduction of product gas. The adsorber is thus ready again for adsorption.

Inasmuch as known processes require at least four adsorbers and several stages for each adsorber, many valves (at least 31) are also required to direct the sequences of the individual gas streams. Such adsorption facilities are very costly, and because of the complexity of the system and number of valves, are hindered with problems or reliability and maintenance.

SUMMARY OF THE INVENTION

An object of this invention is to provide an improved system compared to the above described system, and in particular, a system which requires less valving, is simpler, and is relatively less expensive to operate. Accordingly, further aspects of this invention comprise a process to operate the system and also apparatus for accommodating the process.

Upon further study of the specification and appended claims, further objects and advantages of this invention will become apparent to those skilled in the art.

To achieve these objects, the residual product gases released upon adsorber decompression are collected in separate pressure stages in separate storage vessels, and are then discharged from said storage vessels to presurize or desorb an adsorber.

The process of the invention can be applied in the simplest manner to a facility comprising adsorbers provided with suitable adsorbents and connected to only two storage vessels. Advantageously, however, three or more storage vessels should be used. When using three, the first two preferably are fixed with respect to volume whereas the third may be of the variable volume type. A relatively few valves only are required to seal the storage vessel and to direct the passage of the gas streams.

In the process of the invention, the crude gas containing several components is passed at superatomspheric pressure, preferably in the range of 10 to 200 especially 20 to 40 atmospheres absolute, through a vessel containing adsorbents, for example, molecular sieves, silica gel or activated carbon, the specific type of particulate adsorbent being not of the essence of the invention since any can be used. The impurities are retained by the adsorbent while the non-adsorbed gas, the product, is discharged from the exhaust end of the adsorber. The adsorption stage is continued until at a predetermined position prior to the exhaust end of the adsorber, measurable amounts of impurities are found in the gas flow. At that time, the flow of crude gas is switched to the second adsorber which in the meanwhile was regenerated.

While the adsorption process takes place in the second adsorber, the sequential pressure changes of the invention are produced in the first charged adsorber. Thus upon termination of adsorption, the adsorber is connected by its exhaust end to a first storage vessel and pressure equalization between the two is conducted. In the case of three storage vessels, the dimensions of the first storage vessel are such that the pressure in the adsorber generally drops to about 20 to 35%, preferably about two thirds of its original value. After pressure equalization, the valve to the first storage vessel is closed and another valve is opened to connect the exhaust end of the adsorber to the second storage vessel for further pressure equilization and to further reduce the pressure in the adsorber to about generally 40 to 60%, preferably about half its original value. If there are arranged only two storage vessels the pressure drop in the adsorber after filling the first storage vessel would amount to approximately 38 to 48% of the initial pressure. The optimum number of storage vessels can be determined in the following manner:

1. One chooses a definite pressure difference between the filled and the empty storage vessel (e.g. 2 atm.). This pressure difference defines the magnitude of the storage vessels.
2. The pressure difference between the raw gas pressure and the necessary residue gas pressure is diminished by the amount of the pressure oscillation in the storage vessels according to item 1.
3. The pressure difference according to item 2 is divided into a number of equal parts.
4. To this divided difference the pressure oscillation of the storage vessels is added.
5. One calculates the mass stream from the adsorber with corresponds to the pressure differences calculated according to item 4.
6. One compares the mass stream according to item 5 with the necessary amount of purging gas.
7. One chooses that division (item 3), at which the mass stream according to item 5 is equal or a little bit greater than the minimum purging gas amount.
8. Then the optimum number of storage vessels is equal to the number of the pressure steps calculated according to item 7.

All other numbers than that calculated according to item 8 lead to amounts of purge gas which are either too small or too great, i.e., the system doesn't function at all or it leads to unnecessarily great losses in product gas.

From the foregoing it follows that three storage vessels need not necessarily be optimum, whereas e.g. in the example given below two storage vessels would lead to unnecessarily great losses in hydrogen.

In any case, a final pressure equalization with another storage vessel and simultaneous decrease in pressure of the adsorber is effected, the pressure level being set by the requirements placed on the residual gas. In this step, the adsorber is thereby largely emptied into the third storage vessel.

Usually the residue gas serves for firing the reactors in which the raw gas is produced. The burners have to be delivered with burning gas under pressure, since the burning air is sucked in by the injector action of the expanding burning gas. Moreover, a pressure drop is necessary for transport and regulation.

In general the residue gas is demanded under a pressure of 2 to 7 atm. These are approximately 5 to 25% of the starting pressure under normal circumstances.

The pressure reduction in the third storage vessel results in a pressure which amounts to 75 to 97% of the starting pressure.

Loading of the adsorber takes place in such a manner that an appreciable amount of non-charged adsorbent remains at the product exhaust side. In this manner, only gas of product quality leaves the adsorber during the decompression stages.

Following the filling of the lowest pressure storage tank i.e. the final storage vessel, the contents therein will be at somewhat higher pressure than or at the same pressure as that of the residual gas. In the first case, the excess pressure will be released by discharging some of the gas in the final storage vessel through the adsorber into the residual gas line until there is pressure equalization. In the second case the volume of gas stored from the adsorber will be evacuated through the adsorber by a blower and compressed into the residual gas line. This blower may be located in the flow path (a) in front of the adsorber or (b) behind it. Case (a) provides advantages in energy savings whereas (b) is mechanically more expedient. The adsorbed impurities are desorbed by the purified gas flowing through. If the third storage vessel is variable in volume, then it may be appreciably smaller. It will empty at constant pressure under the influence of the weight of the gasometer bell-shaped head or that of the described blower.

Upon termination of desorption, the valve is closed between the adsorber and the third storage vessel, and if necessary the blower is shut off. The adsorber is then connected to the second storage vessel (if there are three or the first if there are two), and in this manner the pressure in the adsorber is increased further. After pressure equalization, the valve between the adsorber and the second storage vessel is closed and the adsorber is then connected to the first storage vessel to produce a still further increase in pressure in the adsorber. Upon pressure equalization with the first storage vessel, the adsorber is re-pressurized to generally about 10 to 75%, preferably about two thirds of its initial value. Further re-pressurizing of the adsorber to its original pressure is obtained by branching purified gas thereto.

In this manner, it is possible to recover preferably about two thirds of the required compression energy for the compression of the adsorber contents.

In lieu of emptying the adsorbers by forward flow, that is via the clean adsorber end, into the pressure-changing storage vessels, it may be advantageous at times to use reverse flow, i.e., connecting the storage vessels with the crude gas end of the adsorber. However, the storage vessel used for holding the purge gas used for desorption must always be connected with the pure or product end.

Generally the duration of an adsorption-desorption cycle of the invention is from 1 to 45 minutes, a time of 4 to 6 minutes being preferred.

The process of the invention can be conducted at room temperature.

The invention is applicable to adsorption-desorption systems which can be used at all temperatures, provided the regeneration of the loaded adsorbent is performed solely by reducing the pressure and purging at low pressure and not by heating.

The expression "adiabatic" is intended to express that in the process according to the invention no heat is delivered to it from the outside. Therefore, the process proceeds practically in isothermal condition, since the amounts of heat appearing in the gaseous phase during rising and lowering the pressure are neglegibly small in contrast to the heat capacity of the adsorbent. So the invention can be conducted with any type of adsorption system - adiabatic, substantially adiabatic, or substantially isothermal.

From a theoretical point of view, the invention is applicable to all gaseous mixtures, if the least adsorbable component is to be gained as product. For practical purposes, however, it is only applicable to the production of such substances which are only adsorbable very badly, such as hydrogen and helium and perhaps carbon monoxide, nitrogen and argon, if these substances are to be separated from accompanying substances which are more strongly adsorbable. The reason is that a part of the purified gas serves as a purging gas and, therefore, only a poorly adsorbable gas can be taken into consideration.

DETAILED DESCRIPTION OF DRAWINGS

Figure 1:
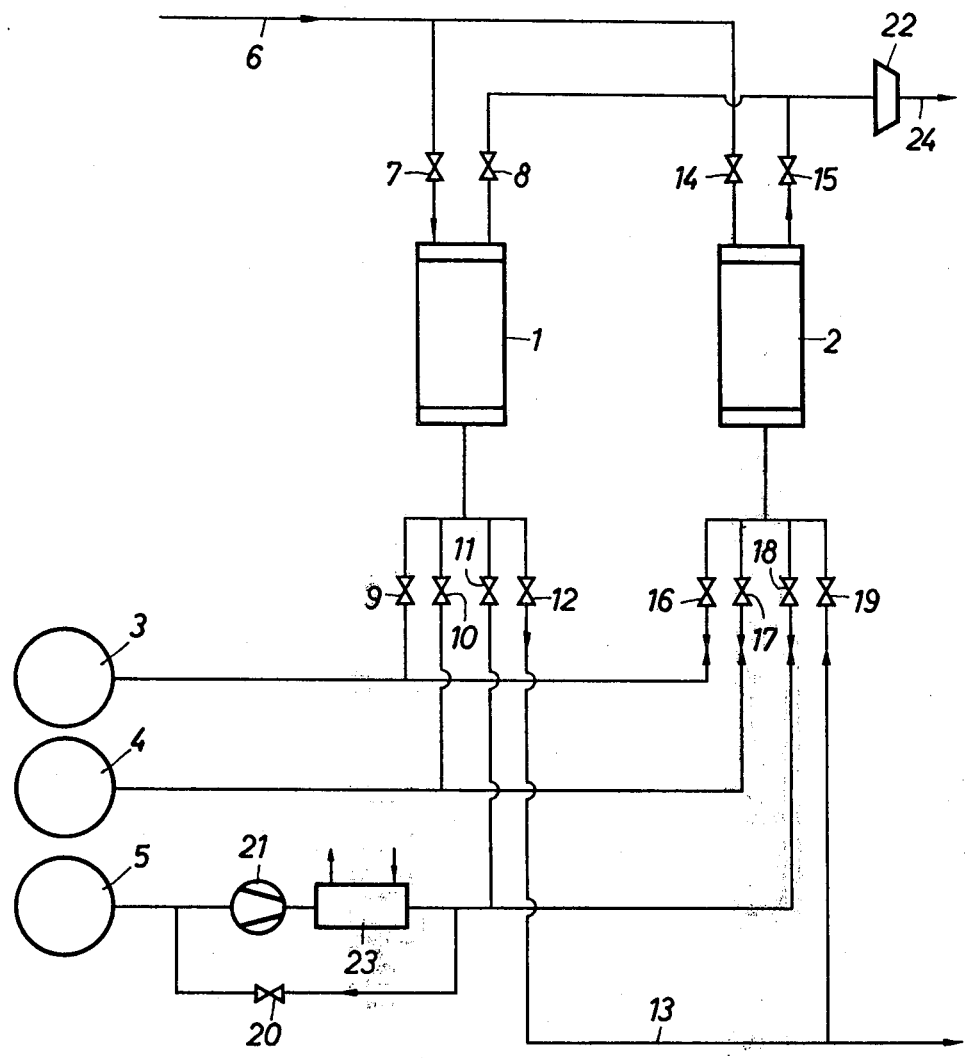
FIG. 1 is a schematic drawing of a preferred embodiment of the invention based on two adsorbers and three storage vessels.

The equipment shown in FIG. 1 comprises two adsorbers 1 and 2 loaded with a suitable mixture of adsorbents, for instance active carbon and a molecular sieve such as zeolite 5A and three storage vessels 3, 4 and 5, which are of fixed volume. In the switching stage shown in FIG. 1, adsorber 1 is set for adsorption and adsorber 2 for desorption and change of pressure. Passing through line 6 and valve 7, crude gas (3,357 Nm$^3$/hr at a pressure of 30 atm. abs.) is introduced with adsorber 1. The composition of the crude gas is as follows:

$H_2$ = 73% by volume
$N_2$ = 0.2 by volume
CO = 12 by volume
$CH_4$ = 4.8 by volume
$CO_2$ = 10 by volume Valves 8, 9, 10 and 11 located at both ends of adsorber 1 are closed. Pure hydrogen passes through valve 12 and line 13, its impurity content being less than 0.01% by volume. 1,700 Nm³/hr. of pure hydrogen are withdrawn as product downstream of valve 19.

During the time adsorber 1 is employed for adsorption, the pressure is descreased in adsorber 2, desorption is carried out, and the pressure is then again increased to that for adsorption. Shortly after switching to pressure decrease, only valve 16 is opened among all the valves 14, 15, 16, 17, 18 and 19 before and behind adsorber 2. Because of the flow of part of the compressed gas in adsorber 2 into storage vessel 3, the latter being at 20 atm. abs., pressure equalization is obtained between the two vessels, which causes the adsorber pressure in adsorber 2 to drop from 30 to 22 atm. abs. while the pressure in storage vessel 3 is simultaneously increased from 20 to 22 atm. abs. After pressure equalization is achieved, valve 16 is closed and valve 17 is opened to equalize the pressure between adsorber 2 and storage vessel 4. The latter vessel is at a pressure of 12 atm. abs. and receives gas from adsorber 2 until its pressure reaches 14 atm. abs., the pressure of adsorber 2 dropping to that value. Valve 17 is then closed and valve 18 opened, thereby establishing communication between adsorber 2 and storage vessel 5 through the by-pass via valve 20. Storage vessel 5 is relatively large, the pressure therein being about 3.5 atm. abs. This pressure is then increased to about 4 atm. abs. by pressure equalization with adsorber 2.

Valve 20 is closed upon completion of pressure equalization, valve 15 is opened, and blower 21 or 22 is turned on. In this manner, the gas in container 5 (following any cooling as required in a cooler 23) is evacuated over the adsorbent in adsorber 2 and thereby desorbs any adsorbed components therein. Residual gas at the rate of 1,657 Nm³/hr. at a pressure of 4 atm. abs. is discharged through line 24. The composition of the residual gas is as follows:

$H_2$ = 45% by volume
$N_2$ = 0.4 by volume
CO = 24.6 by volume
$CH_4$ = 9.7 by volume
$CO_2$ = 20.3 by volume Upon completion of desorption, pressure is built up again in adsorber 2 by turning off blower 21 or 22, closing valves 15 and 18, and opening valve 17. Because of pressure equalization between vessel 4 and adsorber 2, the pressure in vessel 4 drops from 14 to 12 atm. abs. while that in adsorber 2 rises from 4 to 12 atm. abs. Thereupon valve 17 is closed and valve 16 is opened, whereafter the pressure in storage vessel 3 drops from 22 to 20 atm. abs. and that in adsorber 2 rises from 12 to 20 atm. abs. Lastly, valve 16 is closed and valve 19 opened, so that the gas in the product line — which is at 30 atm. abs. — is branched off in part and passed into adsorber 2 until the pressure therein rises from 20 to 30 atm. abs. Then, valve 19 is closed and adsorber 2 is ready for loading with crude gas after the opening of valve 14.

The hydrogen yield in the example described is 69.4%.

Storage vessel 5 may also be a conventional variable volume vessel. While such vessels are more complex than fixed volume vessels, they may on the other hand be made much smaller. Furthermore, their use allows eliminating blower 21, after-cooler 23 and the by-pass with valve 20 as well as blower 22 if care is taken that an external pressure of about the residual gas pressure is maintained over the variable volume vessel.

Figure 2:
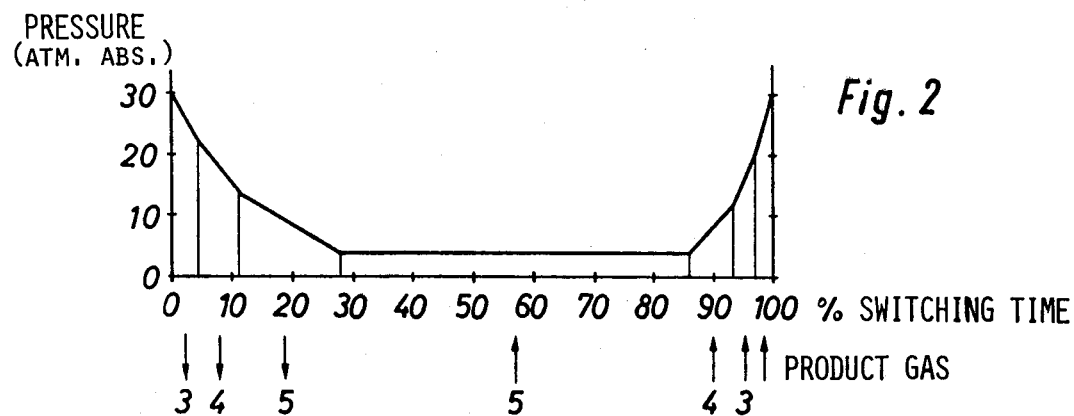
FIG. 2 is a time sequence graph.

FIG. 2 shows a time-sequence diagram for the pressure drop, desorption and pressure build-up in an adsorber. The ordinate shows the adsorber pressure and the abscissa the switching time in %. The first drop in pressure takes place by pressure equalization with storage vessel 3, further decreases taking place by connecting to storage vessels 4 and 5. Upon complete pressure equalization with vessel 5, the system is at its lowest pressure. Thereupon, the evacuation of the gas from vessel 5 is conducted by means of blower 22 and passing the gas through the adsorber for the purposes of desorption. The desorption stage takes the longest, the pressure in the absorber varying hardly at all for practical purposes. When desorption is completed, there will be a gradual build-up of pressure by successively connecting to vessels 4 and 3, the pressure in the adsorber reaching 20 atm. abs. The final pressure build-up to 30 atm. abs. is carried out by introducing the product gas.

Figure 3:
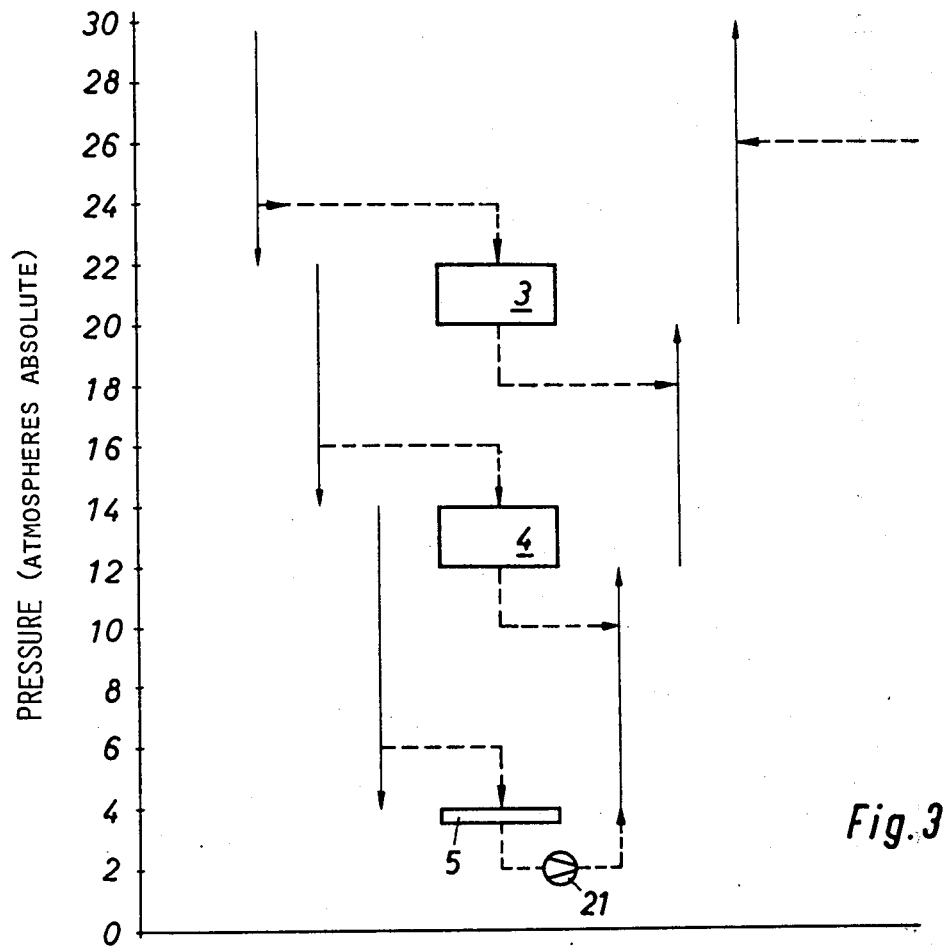
FIG. 3 is a pressure sequence graph within an adsorber also showing the fluctuation in the storage vessels.

FIG. 3 is a pressure sequence graph in an adsorber, the solid arrows showing said sequence while the dashed ones symbolize gas transfers from the adsorber to the storage vessels or vice-versa. The height of the storage vessels shown in rectangular form simultaneously shows the pressure fluctuations in said storage vessels by referring to the ordinate.

Upon being connected with vessel 3, the pressure in the adsorber first drops from 30 to 22 atm. abs. while that in vessel 3 rises from 20 to 22 atm. abs. Because of the connection with vessel 4, the adsorber pressure drops from 22 to 14 atm. abs., while that in vessel 4 rises from 12 to 14 atm. abs. Connecting the adsorber with vessel 5 causes a pressure drop to 4 atm. abs., while the pressure rises from 3.5 to 4 atm. abs. in this vessel. The adsorber pressure remains constant while the vessel is emptied by blower 21, that is, at 4 atm. abs., while that of vessel 5 drops to 3.5 atm. abs. After being connected with vessel 4, the adsorber pressure is increased from 4 to 12 atm. abs., while that of vessel 4 drops from 14 to 12 atm. abs. The next increase in pressure is obtained by connecting with vessel 3, leading to a pressure of 20 atm. abs., that in vessel 3 dropping from 22 to 20 atm. abs. The last increase in pressure from 20 to 30 atm. abs. is obtained by branching the product gas.

Figure 4:
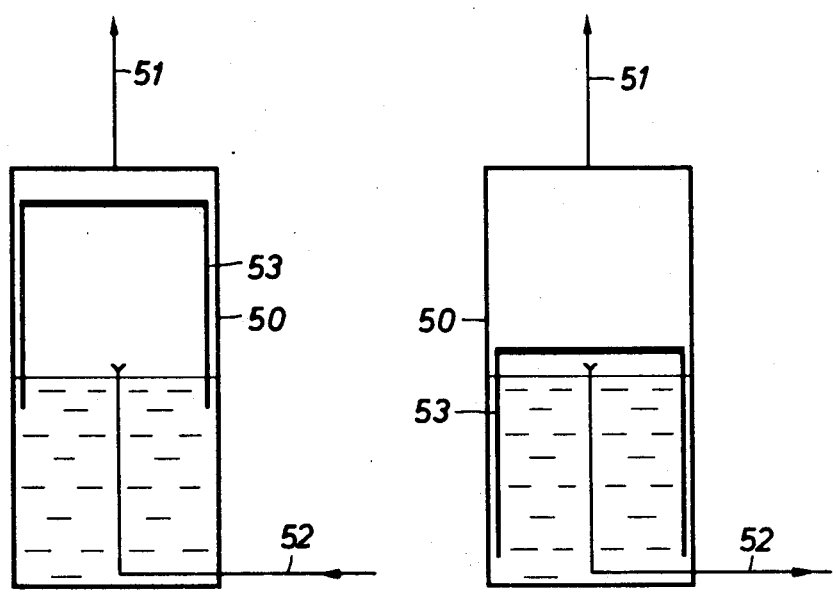
FIG. 4 is a schematic drawing of a storage vessel with a variable volume.

FIG. 4 shows a storage vessel with a variable volume according to the invention. It consists of an outer container 50 which is partially filled with water. The container is a closed container and has connected thereto a pressure equalizing conduit 51 which itself is connected to the residue gas conduit (not shown) and a further conduit 52 which connects the interior of container 50 with the adsorbers. In practical cases these conduits are provided with valves to shut up and open them at will. The valves are omitted, however, for purposes of simplicity. The upper end of conduit 52 is always above the level of the water in container 50. Moreover, the container 50 contains a bell 53 floating on the water. The pressure within the interior of bell 53 is composed of two components: first of the pressure above the bell, which is approximately equal to the residue gas pressure, and the weight of the bell which can be adjusted to the demands.

In the left position shown the interior of the bell 53 is filled with gas from an adsorber, while in the right position there is shown the position of the bell after its contents have emptied into an adsorber.

With such a construction it is possible to maintain in conduit 52 any practical pressure that is wanted.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In an adsorption-desorption process for separating gaseous mixtures comprising passing a stream of crude gaseous mixture under superatmospheric pressure through a first adsorber, withdrawing from said first adsorber a stream of product gas depleted in undesired component; switching the stream of crude gaseous mixture to a second adsorber when the impurity concentration at a given location before the exhaust end of the first adsorber exceeds a given value in the gas; after the crude gas stream is switched away from said first adsorber, decompressing said first adsorber in at least one decompression stage to release residual product gas therefrom; and employing said residual product gas to re-pressurize an adsorber, the improvement which comprises conducting said decompressing in at least two separate decompression stages thereby lowering the pressure in each stage, collecting the residual product gas from each decompression stage in separate storage vessels having different pressures, withdrawing residual product gas from the storage vessel having the lowest pressure and purging the decompressed adsorber to desorb undesired impurities therefrom, and withdrawing residual product gas from another of said storage vessels having a higher pressure than the lowest pressure vessel and partially re-pressurizing the purged adsorber therewith.

2. A process according to claim 1, said purging being conducted in direction counter to that of the adsorption stage.

3. A process according to claim 1, comprising the further step of branching a stream of product gas withdrawn from an adsorber during the adsorption stage, and passing said branched stream of product gas to the partially re-pressurized adsorber to complete repressurization of such adsorber to the original pressure therein.

4. A process ajcording to claim 1, wherein the adsorption-desorption cycle of an adsorber is from 1 to 45 minutes.

5. A process according to claim 4, the duration of the adsorption-desorption cycle being 4 to 6 minutes.

6. A process according to claim 1, wherein the crude gaseous mixture is a crude hydrogen gas containing undesirable gaseous impurities.

7. A process according to claim 6, comprising two adsorbers, three decompression stages and three storage vessels.

8. A process according to claim 7, wherein the first decompression stage reduces the pressure in the adsorber to about two thirds of its original value, and the second decompression reduces the pressure in the adsorber to about one half of its original value.

9. A process according to claim 8 wherein the adsorption stage is substantially adiabatic.

10. A process according to claim 7, wherein the first decompression zone reduces the pressure about 20–35%, and the second decompression zone reduces the pressure about 40 to 60% of its original value.

11. A process according to claim 1, wherein the optimum number of storage vessels is determined as follows:
   1. determining a definite pressure difference between the filled and empty storage vessel; this pressure difference defines the magnitude of the storage vessels;
   2. the pressure difference between the raw gas pressure and the necessary residue gas pressure is diminished by the amount of the pressure oscillation in the storage vessels according to item 1;
   3. the pressure difference according to item 2 is divided into a number of equal parts;
   4. to this divided difference the pressure oscillation of the storage vessels is added;
   5. determining the mass stream from the adsorber with corresponds to the pressure differences calculated according to item 4;
   6. comparing the mass steam according to item 5 with the necessary amount of purging gas;
   7. determining that division (item 3), at which the mass stream according to item 5 is equal or a little bit greater than the minimum purging gas amount;
   8. whereby the optimum number of storage vessels is equal to the number of the pressure steps calculated according to item 7.

12. A process according to claim 1, wherein said crude gaseous mixture is impure hydrogen.

13. A process according to claim 1, wherein the adsorption pressure is about 10 to 200 atmospheres absolute.

14. A process according to claim 1, wherein the adsorption pressure is about 20 to 40 atmospheres absolute.

15. Apparatus for conducting the process of claim 1, comprising at least two adsorbers (1 and 2), the ends of which are in valved communication with three storage vessels (3, 4 and 5), said adsorbers (1 and 2) being connected at their intake sides with a residual gas line (24) which is provided with a blower (22), conduit and valve means for effecting on-off communication so that each adsorber can be placed in communication with only one vessel at a time, and another blower (21) disposed between adsorbers (1 and 2) and storage vessel (5).

16. Apparatus according to claim 15 with at least one of the storage vessels having a variable volume, comprising an outer container (50) partially filled with water, an inner bell (53) floating on the water, a conduit (51) connected to the gas space above the water outside the bell (53) and a conduit (52) connected to the gas space above the water inside the bell (53).

* * * * *